Patented Mar. 18, 1924.

1,487,057

UNITED STATES PATENT OFFICE.

ELWOOD GOSSETT, OF WINNIPEG, MANITOBA, CANADA.

BONDING MATERIAL.

No Drawing. Application filed February 9, 1922. Serial No. 535,387.

*To all whom it may concern:*

Be it known that I, ELWOOD GOSSETT, of the city of Winnipeg, in the Province of Manitoba, Canada, have invented certain new and useful Improvements in Bonding Materials, of which the following is the specification.

The invention relates to a bonding material and contemplates the provision of means whereby either vegetable or mineral matter may be combined in a homogeneous mass to provide a solid form of considerable strength and having the appearance of rock or stone. The finished product may be given a high polish or finish, it being understood that the finished product consists of divided parts which may be combined in a more or less plastic state and poured and will thereafter harden, the final appearance and shape of the finished product being entirely optional.

In carrying out my invention I can utilize vegetable or mineral matter such as straw of various kinds, crushed rock or stone, sand, gravel, decomposed or crushed granite, broken or crushed brickbats, or in fact any organic or inorganic matter.

The selected material is bonded by my bonding material into a solid mass, the resultant mass varying in hardness in proportion to the relative hardness as a dry aggregate. The finished product will also vary in weight depending on the material used.

Where material such as wheat, oat, or flax straw is used the straw is cut or ground so that it has a chaff like appearance; it is then wet or soaked in a strong solution of salt water. I have found rock salt is best for this purpose; and one can use two pounds of salt to one gallon of water. After the material has been thoroughly saturated with the salt solution it can be kept indefinitely or until such time it is desired to use the same.

When required for use the saturated straw is mixed with a fine filler, such as powdered rock, gypsum or such like. I have found both these latter substances desirable. The amount of the filler used varies according to the fineness of the straw. The finer the straw the less filler required.

Two mixtures are then prepared, the first a true solution and the second a wet mixture, as following:

1.

Water _ _ _ _ _ _ _ _ _ _ _ _ _ _ _ _ 1 gallon.
Salt (rock or common) _ 2 pounds.

2.

Water _ _ _ _ _ _ _ _ _ _ _ _ _ _ _ _ 1 gallon.
Powdered iron rust _ _ _ _ 1 oz.
Sulphate of copper _ _ _ _ 1½ oz.
Bentonite _ _ _ _ _ _ _ _ _ _ _ _ 1½ pounds.

The first mixture is a simple solution made by dissolving the salt in the proportions stated. The second mixture is made by first dissolving the sulphate of copper in the water, then adding the bentonite and letting the mixture stand until the bentonite has dispersed, at which time the mixture will be of a paste consistency. Stir well and add the powered iron rust. The first or salt solution is then added to the second mixture and the combined solution and mixture are thoroughly mixed together. The resultant mixture is then added to or mixed with the straw (previously treated with salt solution) and a material of the consistency of mortar is the result.

This final material can be poured into moulds of any shape or it may be worked into a putty or dough consistency and may be pressed into moulds or rolled into slab or board form, it being understood that after a time the said material becomes quite hard and depending on the form can be used as tiling, wall boards, partitioning boards, or such like.

Obviously the bulk of the material is straw so that the finished product is comparatively light.

Where crushed rock, sand, gravel or such like are used instead of straw they are not initially treated with the salt solution but are added direct to the mixture resultant from the combination of the solution 1 and the mixture 2 above set forth. The finished product is much harder and heavier and can be formed into building blocks or used for sidewalk or road purposes.

Whilst I have recited specific materials such as straw, crushed rock and so forth I wish it to be distinctly understood that the material such as that which is used can be either vegetable or mineral matter of any kind and such material can be bonded into a homogeneous mass by mixing it with the bonding material herein stated.

What I claim as my invention is:

1. The herein described bonding material consisting of bentonite, sulphate of copper and powered iron rust mixed in water, to which is added a solution of salt water.

2. The herein described bonding material consisting of a solution of salt and water and a mixture of bentonite, sulphate of copper and powdered iron rust mixed in water, which is mixed with the said solution.

3. The herein described bonding material consisting of a solution of salt, two pounds, and water, one gallon, which solution is added to a mixture consisting of bentonite, one and one half pounds, sulphate of copper, one and one half ounces, powered iron rust, one ounce, and water, one gallon.

4. The herein described method of bonding finely divided material to form a plastic mass, which consists in primarily preparing a solution of salt and water, then preparing a mixture of bentonite, sulphate of copper, powered iron rust and water, then mixing said mixture and said solution and finally adding the resultant mixture to the finely divided material.

Signed at Winnipeg, this 14th day of January, 1922.

ELWOOD GOSSETT.

In the presence of—
GERALD S. ROXBURGH,
M. B. KELLEHER.